US011009975B2

(12) United States Patent
Matsui

(10) Patent No.: US 11,009,975 B2
(45) Date of Patent: May 18, 2021

(54) TOUCH INPUT SYSTEM

(71) Applicant: SHARP KABUSHIKI KAISHA, Sakai (JP)

(72) Inventor: Kuniaki Matsui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/800,371

(22) Filed: Feb. 25, 2020

(65) Prior Publication Data

US 2020/0293121 A1 Sep. 17, 2020

(30) Foreign Application Priority Data

Mar. 15, 2019 (JP) ............................ JP2019-048231

(51) Int. Cl.

| | |
|---|---|
| ***G06F 3/045*** | (2006.01) |
| ***G06F 3/039*** | (2013.01) |
| ***G06F 3/0488*** | (2013.01) |
| ***G06F 3/044*** | (2006.01) |

(52) U.S. Cl.

CPC ............ *G06F 3/039* (2013.01); *G06F 3/0446* (2019.05); *G06F 3/04883* (2013.01)

(58) Field of Classification Search

CPC .... G06F 3/03545; G06F 3/039; G06F 3/0446; G06F 3/04883

See application file for complete search history.

(56) References Cited

U.S. PATENT DOCUMENTS

2018/0239479 A1* 8/2018 Suzuki ................ G06F 3/03545

FOREIGN PATENT DOCUMENTS

JP 2015-041318 A 3/2015

* cited by examiner

*Primary Examiner* — Insa Sadio
(74) *Attorney, Agent, or Firm* — ScienBiziP, P.C.

(57) ABSTRACT

Provided is a touch in, system for entering an input with an input tool onto an input surface for touch input. The touch input system includes a plurality of sensor electrodes, a position detection circuit that executes a position detection process for detecting a position on the input surface contacted by the input tool, based on a change in electrostatic capacitance of the plurality of sensor electrodes, an input tool identification circuit that executes an attribute identification process for identifying an attribute for the input tool, and a discharge circuit that executes a discharge process for discharging electric charges charged in the plurality of sensor electrodes.

20 Claims, 15 Drawing Sheets

FIG. 6A

| IDENTIFIER TYPE | $f_0$ (kHz) | WRITING COLOR |
|---|---|---|
| ID1 | 100 | BLACK |
| ID2 | 120 | BLUE |
| ID3 | 140 | GREEN |
| ID4 | 160 | YELLOW |
| ID5 | 180 | ORANGE |
| ID6 | 200 | RED |

FIG. 6B

PEN POINT THICKNESS

| IDENTIFIER TYPE | $f_0$ (kHz) | WRITING COLOR | | PEN POINT SHAPE |
|---|---|---|---|---|
| ID-a | 100 | BLACK | THIN | ● |
| ID-b | 105 | BLACK | THIN | ■ |
| ID-c | 110 | BLACK | THICK | ● |
| ID-d | 115 | BLACK | THICK | ■ |
| ID-e | 120 | BLUE | THIN | ● |
| ID-f | 125 | BLUE | THIN | ■ |
| ID-g | 130 | BLUE | THICK | ● |
| ID-h | 135 | BLUE | THICK | ■ |
| ID-i | 140 | GREEN | THIN | ● |
| : | : | : | : | : |
| ID-u | 215 | RED | THICK | ● |

$$f_o = \frac{1}{2\pi LC}$$

TOUCH INPUT SYSTEM

INCORPORATION BY REFERENCE

This application is based upon and claims the benefit of priority from the corresponding Japanese Patent Application No. 2019-048231 filed on Mar. 15, 2019, the entire contents of which are incorporated herein by reference.

BACKGROUND OF THE INVENTION

Field of the Invention

The present disclosure relates to a touch input system for entering an input onto an input surface for touch input by using an input tool.

Description of the Background Art

Input devices for entering a writing input onto a touch input surface (touch panel) by using an electronic pen have become widespread. For example, there is known a coordinate detection device for detecting an indicator (input tool) such as an electronic pen or a finger by using both an electrostatic capacitance system and an electromagnetic induction system.

However, in the conventional technology, when an electromagnetic induction is driven, electric charges are accumulated in a capacitive sensor including X parallel electrodes and Y parallel electrodes included in a touch panel, and thus, it is difficult to detect an accurate capacitance change during detecting coordinates. Further, if the electromagnetic induction system is switched to the electrostatic capacitance system while electric charges are accumulated in the sensor, the electric charges may flow into the sensor, and the device may be destroyed.

An object of the present disclosure is to improve an input detection accuracy by removing electric charges charged in a sensor in a touch input system for performing an electrostatic capacitance driving and an electromagnetic induction driving.

SUMMARY OF THE INVENTION

A touch input system according to an aspect of the present disclosure is a touch input system for entering an input with an input tool onto an input surface for touch input, and includes a plurality of sensor electrodes, a position detector that executes a position detection process for detecting a position on the input surface contacted by the input tool, based on a change in electrostatic capacitance of the plurality of sensor electrodes, an input tool identification device that executes an attribute identification process for identifying an attribute for the input tool, and a discharge circuit that executes a discharge process for discharging electric charges charged in the plurality of sensor electrodes.

According to the present disclosure, in the touch input system for performing an electrostatic capacitance driving and an electromagnetic induction driving, an input detection accuracy can be improved by removing electric charges charged in a sensor.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6A is a table showing an example of a definition for associating a resonance frequency with a writing color of a pen in the touch input system according to the embodiment of the present disclosure;

FIG. 6B is a table showing an example of a definition for associating a resonance frequency, a writing color of a pen, a thickness of a pen point, and a shape of a pen point in the touch input system according to the embodiment of the present disclosure;

DESCRIPTION OF THE PREFERRED EMBODIMENTS

Below, an embodiment of the present disclosure will be described with reference to the attached drawings. It is noted that the following embodiment is an example in which the present disclosure is embodied, and does not intend to limit the technical scope of the present disclosure.

A touch input system according to the present disclosure is a system for entering an input with an input tool onto an input surface for touch input. Here, the input surface includes various media that receive is input with an input tool and include a board such as a white board or a blackboard, and a touch panel with a display (touch panel device) such as an electronic blackboard (electronic board). In the embodiment of the present disclosure, a whiteboard (hereinafter, referred to as a "board") will be mainly described as an example of the input surface. The input tool includes various writing tools with which it is possible to write into the input surface, including a pen such as a marker pen or an electronic pen, an eraser, and a brush. In the embodiment of the present disclosure, a marker pen (hereinafter, referred to as a "pen") will be mainly described as an example of the input tool. The touch input is an input onto the input surface with the input tool, and includes, for example, writing with the pen (a marker pen and an electronic pen) or the brush, and erasing handwriting with the eraser.

Configuration of Touch Input System

Figure 1:
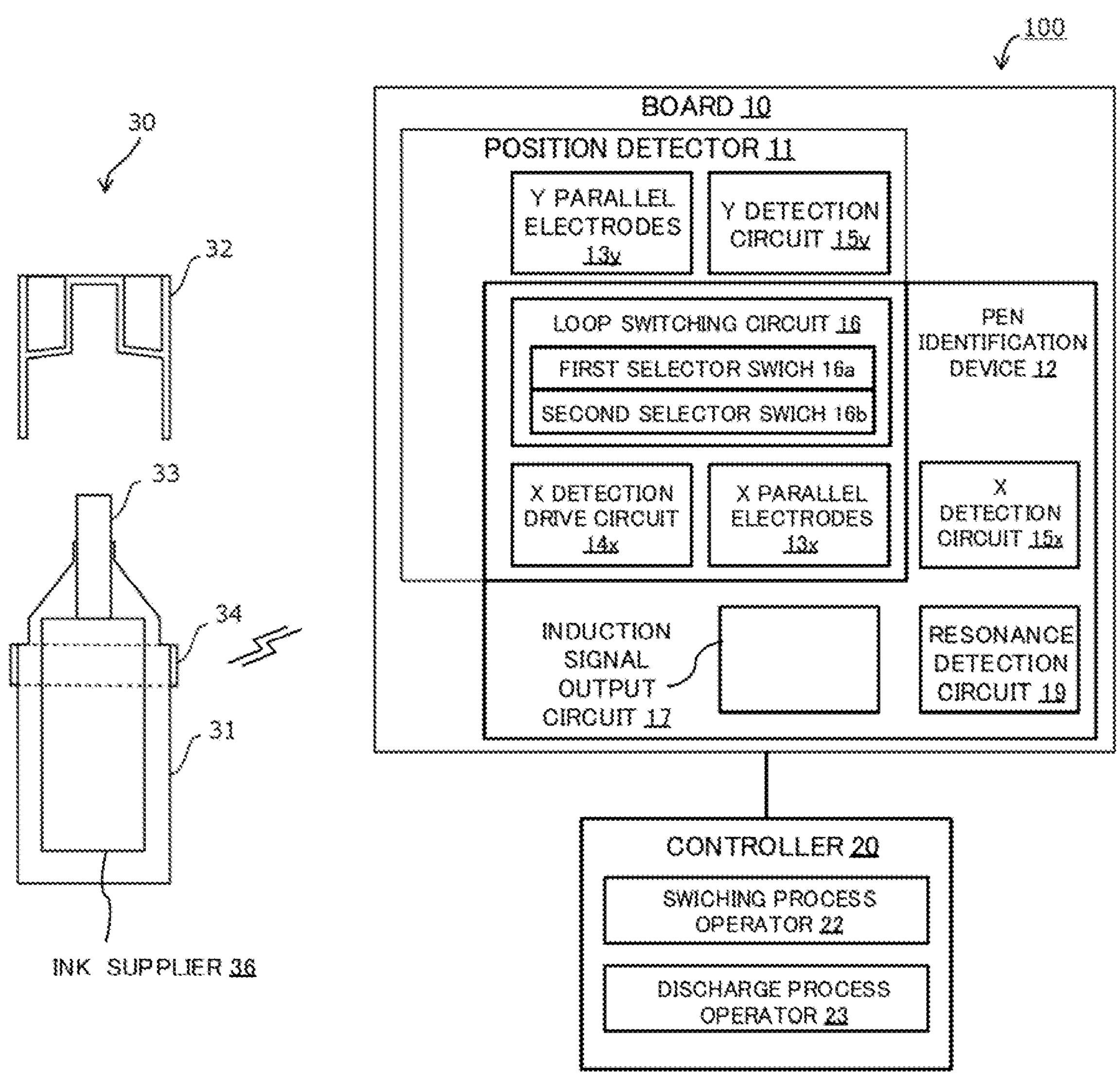
FIG. 1 is an explanatory diagram illustrating an example of a configuration of a touch input system according to an embodiment of the present disclosure.
Figure 2:
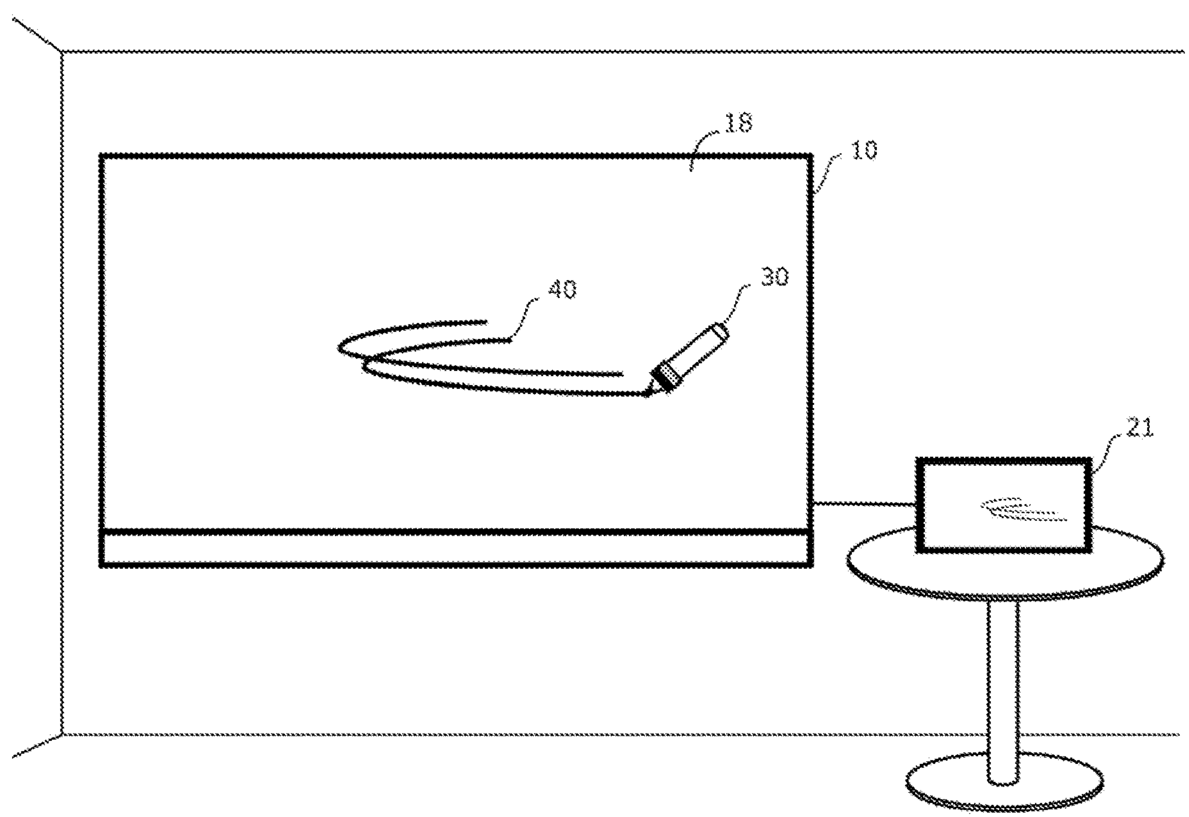
FIG. 2 is an explanatory diagram illustrating an example of a mode in which the touch input system according to the embodiment of the present disclosure is used.
Figure 3:
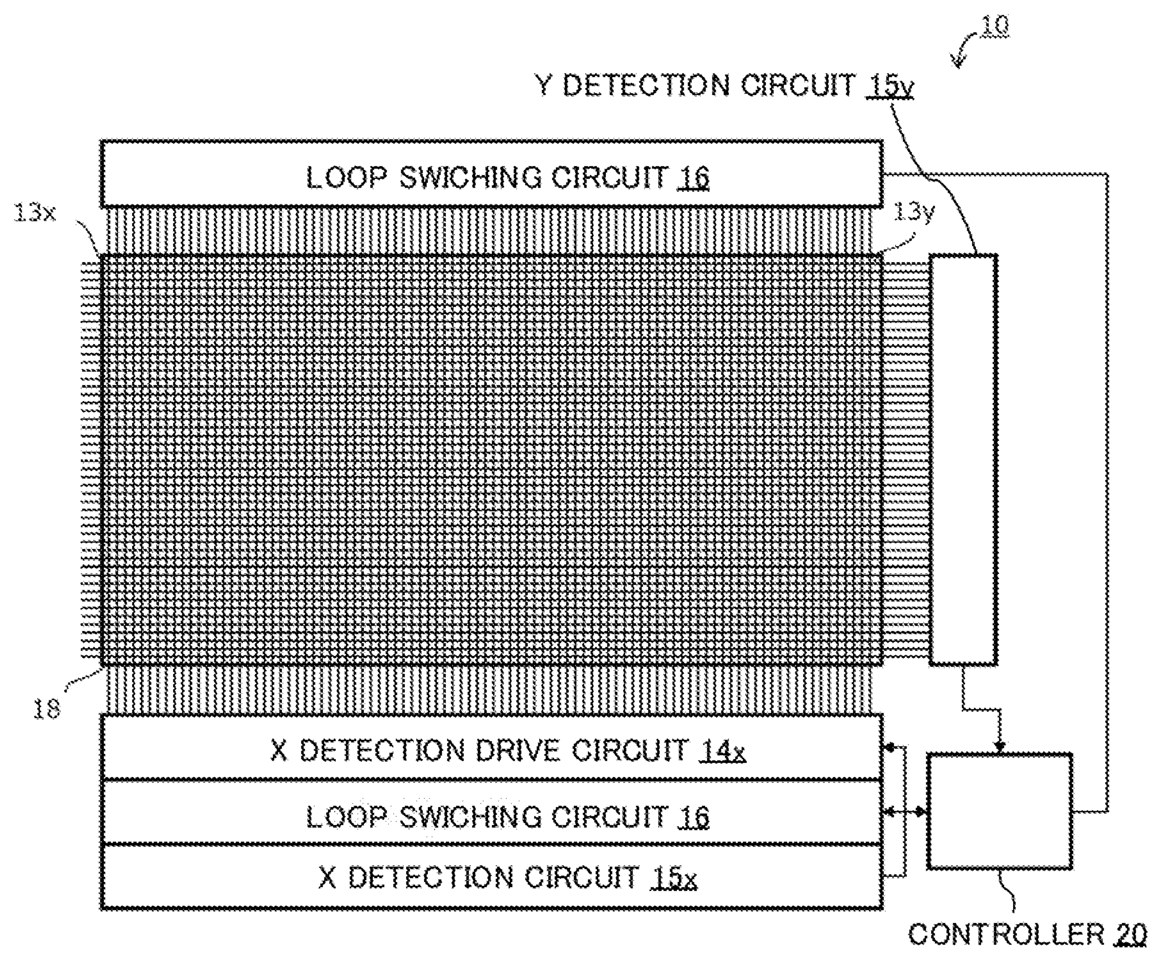
FIG. 3 is a diagram illustrating a simplified configuration of a board according to the embodiment of the present disclosure.
Figure 4:
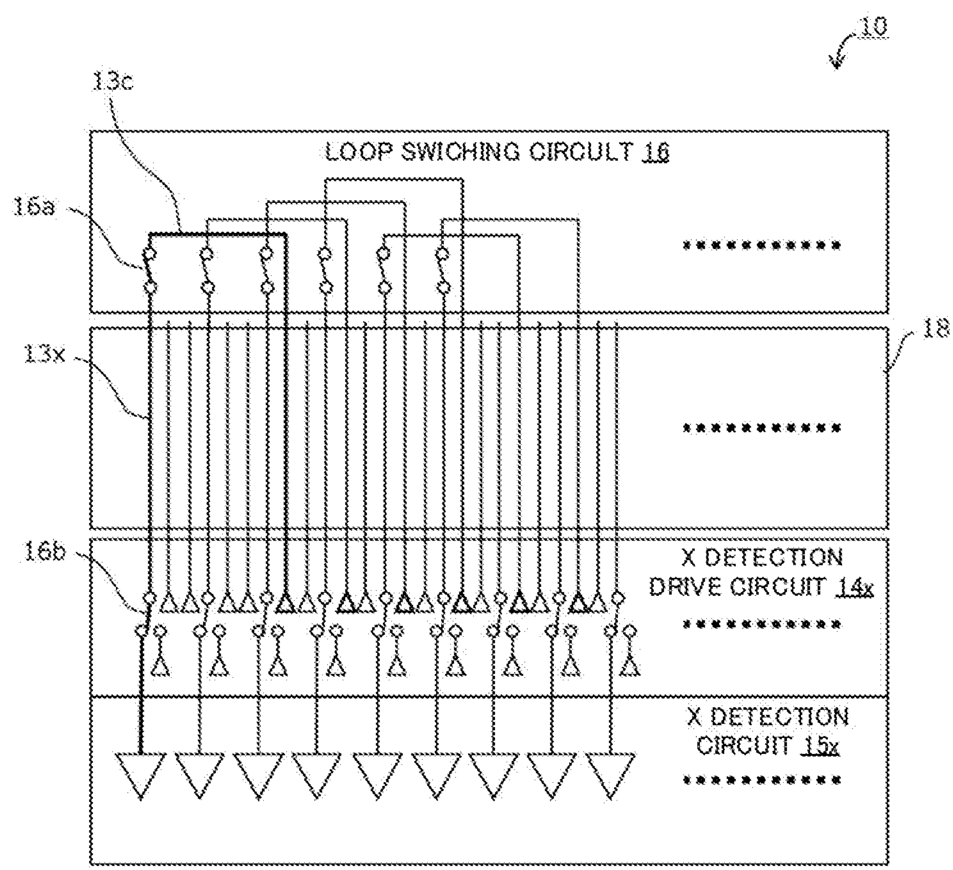
FIG. 4 is a diagram illustrating a specific configuration of the board according to the embodiment of the present disclosure.
Figure 5:
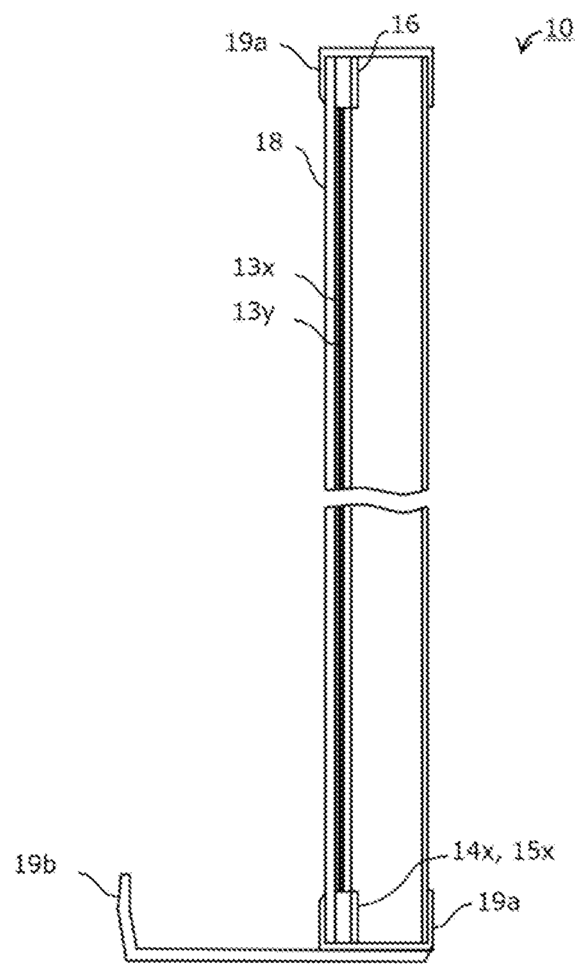
FIG. 5 is a diagram illustrating a configuration in a cross section along a vertical direction of the board according to the embodiment of the present disclosure.

FIG. 1 is an explanatory diagram illustrating an example of a configuration of the touch input system according to the present disclosure. FIG. 2 is an explanatory diagram illustrating an example of a mode in which the touch input system illustrated in FIG. 1 is used. FIG. 3 is an explanatory diagram illustrating a configuration of a board 10 illustrated in FIG. 1, particularly, an arrangement of X parallel electrodes and Y parallel electrodes. FIG. 4 is an explanatory diagram illustrating a function of a loop switching circuit, in the board 10 illustrated in FIG. 1. FIG. 5 is an explanatory diagram illustrating a configuration of the board 10 illustrated in FIG. 1 in a cross section along a vertical direction.

A touch input system 100 illustrated in FIG. 1 roughly includes a pen 30 and the board 10. The pen 30 includes a pen body 31, a cap 32, a pen point 33, an identifier 34, and an ink supplier 36. In the illustration of FIG. 1, it is possible to recognize a shape of the pen 30. The identifier 34 includes an identification signal output circuit not illustrated in FIG. 1. A specific configuration of the identifier 34 will be described later.

The cap 32 is attachable to and detachable from the pen body 31 and covers the pen point 33 nut to be exposed while being attached to the pen body 31.

The pen point 33 is formed of a felt material impregnated with ink. Typically, the pen 30 has a configuration known as a marker pen for a whiteboard. If a first end of the pen point 33 exposed when the cap 32 is removed touches a writing area 18 of the board 10, ink adheres to that touch position and leaves a handwriting 40 on the hoard 10 (see FIG. 2).

A second end of the pen point 33 contacts the ink supplier 36 in which ink is stored, and the ink is supplied from the ink supplier 36 to the pen point 33 by a capillary phenomenon.

The identifier 34 is attached to an outer periphery of the pen body 31 near a place where the cap 32 fits. The identifier 34 has a configuration that the identifier 34 is attachable (detachable) to (from) the pen 30. As described above, the identifier 34 includes the identification signal output circuit not illustrated in FIG. 1. An example of a specific configuration of the identification signal output circuit is an LC resonance circuit including an inductance component L and a capacitor component C. The LC resonance circuit is an example of an identification signal output circuit of the present disclosure.

If a writing with the pen 30 is entered in the writing area 18 (see FIG. 2) of the board 10, a handwriting is formed in the writing area 18. Preferably, the handwriting can be erased in the writing area 18. If the board 10 is inexpensive, the board 10 may be disposable, but it is preferable that a handwriting is erasable and formable on the board 10 many times.

As illustrated in FIG. 5, the board 10 is surrounded by an edge member 19*a* to ensure the strength. A surface (left surface in FIG. 5) of the board 10 surrounded by the edge member 19*a* defines the writing area 18. A pen receiver 19*b* is formed at a lower end of the board 10. If the pen 30 is a marker pen, the corresponding writing area 18 includes a surface like the surface of a marker board.

As illustrated in FIG. 1, in terms of a function, the board 10 includes roughly a position detector 11 and a pen identification device 12.

The position detector 11 detects coordinates of a position where the pen point 33 of the pen 30 contacts the board. The pen identification device 12 detects an identification signal from the identifier 34 attached to the pen 30 to identify an attribute (described later) for the pen 30.

As an example of a configuration for realizing these functions, the position detector 11 operates as a capacitive touch panel. The pen identification device 12 operates as an electromagnetic induction circuit to detect an identification signal from the identifier 34.

The position detector 11 includes Y parallel electrodes 13*y*, a Y detection circuit 15*y*, X parallel electrodes 13*x*, an X detection drive circuit 14*x*, and a loop switching circuit 16. Out of these components, hardware including the X parallel electrodes 13*x* and the X detection drive circuit 14*x* is shared with the pen identification device 12. Further, the loop switching circuit 16 is a circuit for switching between a case where the shared hardware is used for the position detector 11 and a case where the shared hardware is used for the pen identification device 12. The position detector 11 is an example of a position detector of the present disclosure. The X parallel electrodes 13*x* and the Y parallel electrodes 13*y* are examples of a sensor electrode of the present disclosure. The X detection drive circuit 14*x* is an example of a drive circuit of the present disclosure.

The pen identification device 12 includes the X parallel electrodes 13*x* and the X detection drive circuit 14*x* shared with the position detector 11, the loop switching circuit 16 that switches the hardware, and an X detection circuit 15*x*. The pen identification device 12 is an example of an input tool identification device of the present disclosure. The X detection circuit 15*x* is an example of a detection circuit of the present disclosure.

The X parallel electrodes 13*x* are a plurality of electrodes buried near the surface of the board 10 onto which a writing with the pen 30 is entered. The X parallel electrodes 13*x* are each arrayed in an X direction (in the horizontal direction) and extend in a Y direction (in the vertical direction) (in a first direction of the present disclosure) (see FIG. 3).

On the other hand, the Y parallel electrodes 13*y* are a plurality of electrodes buried near the surface of the board 10 onto which a writing with the pen 30 is entered. The Y parallel electrodes 13*y* are each arrayed in the Y direction (in the vertical direction), and extend in the X direction (in the horizontal direction) (in a second direction of the present disclosure) (see FIG. 3). Each of the Y parallel electrodes 13*y* is buried at a depth different from each of the X parallel electrodes 13*x*. Accordingly, each of the Y parallel electrodes 13*y* intersects with each of the X parallel electrodes 13*x* via an insulating layer having a predetermined thickness to avoid contact each other (see FIG. 5). One of the X parallel electrodes 13*x* and one of the Y parallel electrodes 14 are included in one sensor that detects a position (position coordinates) of the pen 30 in contact with the board 10, for example, That is, a plurality of sensors are arranged on the board 10 in the X direction and in the Y direction.

An aluminum plate that electrically shields the X parallel electrodes 13*x* and the Y parallel electrodes 13*y* buried near the surface, a steel plate that magnetically shields the same, or the like is not suitable for a member of the surface of the board 10 configuring the writing area 18. For example, a resin material such as an epoxy resin or a polycarbonate resin whose surface is coated with a melamine resin may be employed for the surface of the board 10.

As illustrated in FIG. 3, the X detection drive circuit 14*x* is connected to a first end of the X parallel electrodes 13*x*, and applies a predetermined voltage to each of the X parallel electrodes 13*x*. The applied voltage may differ in magnitude between a case where the X parallel electrodes 13*x* function as the position detector 11 and a case where the X parallel electrodes 13*x* function as the pen identification device 12. When a voltage is applied, for example, an impulse voltage is sequentially applied from one of the X parallel electrodes 13*x* on a left end to one of the X parallel electrodes 13*x* on a right end.

The Y detection circuit 15*y* detects a magnitude of a voltage or a current induced in each of the Y parallel electrodes 13*y* as the X detection drive circuit 14*x* is driven. The magnitude depends on a magnitude of a coupling capacitance between each of the X parallel electrodes 13*x* and each of the Y parallel electrodes 13*y*, but the magnitude of the coupling capacity differs between a case where a dielectric material or a metallic material is in contact with the board near an intersection between the electrodes 13*x* and 13*y* and a case where a dielectric material or a metallic material is not in contact therewith. For example, the pen point 33 impregnated with ink and a finger of a person are made of a dielectric material, and thus, if these contact the board, the coupling capacitance increases. When a change in the coupling capacitance is detected, it is possible to detect the position coordinates where the pen point 33 or a finger of a person touches the hoard 10. This is known as an operation of a capacitive touch panel. Thus, the position detector 11 detects the position coordinates by detecting a change in the coupling capacitance (electrostatic capacitance) between the X parallel electrodes 13*x* and the Y parallel electrodes 13*y*, in a contact area between the pen point 33 impregnated with ink in the pen 30 and the board 10, or in a handwriting area (handwriting 40) generated when the ink is applied to the board 10 as a result of a contact of the pen point 33 to the board 10. As described above, the position detector 11 executes a position detection process where position coordinates on the board 10 contacted by the pen 30 is detected based on a change in the electrostatic capacitance of the X parallel electrodes 13*x* and the Y parallel electrodes 13*y*.

Generally, the magnitude of the coupling capacitance is different between a case where a finger of a person touches the board 10 and a case where the pen point 33 touches the board 10, and thus, the position detector 11 not only detects position coordinates where the pen point 33 or a finger of a person touches the board 10, but also may determine whether the board 10 is touched by a finger of a person or the pen point 33, based on a difference in coupling capacitance.

As illustrated in FIG. 4, the loop switching circuit 10 includes a first selector switch 113*a* that switches whether two X parallel electrodes 13*x* separated by a predetermined distance, out of the plurality of X parallel electrodes 13*x*, are connected at a second end side. If the pair of X parallel electrodes 13*x* are connected at the second end side by the first selector switch 16*a*, a U-shaped current path is formed. This functions as an induction coil of the pen identification device 12. A second selector switch 16*b* is arranged at a first end side of the U-shaped current path.

The second selector switch 16*b* operates in synchronization with the first selector switch 16*a*. For example, with the first selector switch 16*a* disconnecting the pair of X parallel electrodes 13*x*, the second selector switch 16*b* connects the X parallel electrodes 13*x* to the X detection drive circuit 14*x*. Also, for example, with the first selector switch 16*a* connecting the pair of X parallel electrodes 13*x*, the second selector switch 16*b* connects the X parallel electrodes 13*x* to the X detection circuit 15*x*. Therefore, with the pair of X parallel electrodes 13*x* being disconnected, each of the X parallel electrodes 13*x* is respectively driven by the corresponding X detection drive circuit 14*x*.

On the other hand, in a state where the pair of X parallel electrodes 13*x* are connected to form the U-shaped current path functioning as an induction coil, the second selector switch 161) connects the X parallel electrode 13*x* at a first end side of the U-shaped current path to the X detection circuit 15*x*. There is no selector switch at a second end side of the U-shaped current path, and the second end side is driven by the X detection drive circuit 14*x*. Thus, the second selector switch 16*b* switches connection destinations of the X parallel electrodes 13*x* at the second end side. The second selector switch 16*b* is an example of a selector switch of the present disclosure.

In the present embodiment, there are a plurality of pairs of the U-shaped current paths (loop circuits) forming the induction coil, which are arrayed in an X direction (lateral direction).

If the loop switching circuit 16 uses the X parallel electrodes 13*x* as the pen identification device 12, for example, the loop switching circuit 16 sequentially drives the induction coil one by one from the induction coil on a left end to the induction coil on a right end. In FIG. 4, an induction coil 13*c* on the left end is indicated by a line thicker than the other induction coils to indicate that only the induction coil on the left end is being driven. The second end of the induction coil 13*c* being a U-shaped current path, is driven by the X detection drive circuit 14*x* while a drive frequency is being changed. The magnitude of a current flowing through the induction coil to correspond to the frequency is detected by the X detection circuit 15*x* at a first end side of the induction coil 13*c*. Subsequently, the induction coil on the right of the induction coil 13*c* is detected in much the same way, and the next induction coil to the right is detected in much the same way. The detection proceeds sequentially this way.

The loop switching circuit 16 is a constituent component required for the position detector 11 and the pen identification device 12 to share the X parallel electrodes 13*x*.

If the identifier 34 exists in the vicinity of the driven induction coil, and the induction coil is driven at a drive frequency corresponding to a resonance frequency of the identifier 34, a large resonance current, flows through the resonance circuit 35 as a result of electromagnetic coupling with the induction coil. Correspondingly, a large current also flows through the induction coil. When a magnitude of the current is detected in the X detection circuit 15*x*, it is possible to detect in which area in the X direction the identifier 34 of which resonance frequency exists.

The resonance frequency of the identifier 34 is previously defined according to the attribute of the pen 30. FIG. 6A and FIG. 6B are tables for showing an example of a definition for associating a resonance frequency f0 with the attribute of the pen 30. A list shown in FIG. 6A shows an example in which an ink color (a writing color and an input color) of the pen is associated with the resonance frequency f0 of the identifier 34. Different resonance frequencies f0 are defined to correspond to pens having various colors such as black, blue, green, yellow, orange, and red, respectively. According to the writing color of the pen, a user attaches the identifier 34 for the resonance frequency f0 corresponding to the writing color, to the pen. The pen identification device 12 executes an attribute identification process for identifying the attribute for the pen 30.

A list shown in FIG. 6B shows an example for defining attributes such as a thickness of the pen point and a shape of the pen point as well as the writing color of the pen 30 in association with the resonance frequency f0 corresponding to a combination among the attributes. As in the list shown in FIG. 6B, when the resonance frequency f0 uniquely corresponding to the combination among a plurality of attribute items is assigned, it is possible to obtain a plurality of attribute items corresponding to the detected resonance frequency f0. It is noted that the resonance frequency f0 is not limited to values shown in FIG. 6A and FIG. 6B, but is selected based on a balance between a size and an oscillation energy (intensity) of a resonance coil 341 (described later) of the identifier 34. For example, the resonance frequency 3 may be defined in a range from 400 to 700 kHz.

If the position detector 11 detects position coordinates of the pen point 33 within an area where the pen identification device 12 detects the presence of the identifier 34, the touch input system 100 generates handwriting data corresponding to the position coordinates and the attribute of the pen corresponding to the identification information.

The handwriting data may be generated based on detection contents from the position detector 11 and the pen identification device 12, for example, by causing a personal computer to execute a dedicated processing program. Alternatively, a microcomputer may be incorporated in the board 10 to cause the microcomputer to execute not only the processes of the position detector 11 or the pen identification device 12 but also a process for generating the handwriting data.

FIG. 1 provides illustration that it is the controller 20 that performs a process for generating the handwriting data. The controller 20 is configured mainly of a CPU or a microcomputer, with peripheral circuits such as a timer and an input/output circuit, a memory, and the like.

The controller 20 may be a component separate from the board 10, or may be integrated with the board 10, that is, incorporated in the board 10.

In other words, the controller 20 may perform the process outside of the touch input system 100 or may be included in the touch input system 100.

In the former case, the touch input system 100 detects and provides information used as the basis for generating the handwriting data. In the latter case, in addition to the processes in the former case, the touch input system 100 also generates the handwriting data.

If the touch input system 100 also generates the handwriting data, the touch input system 100 may connect a display device 21 to the controller 20 to display the generated handwriting data in real time, for example, as illustrated in FIG. 2.

Of course, even if there is no display on the display device 21, the handwriting 40 written with the pen 30 remains in the writing area 18 of the board 10.

The display device 21 is effective for confirming that the handwriting data generated by the controller 20 matches the handwriting 40 in the writing area 18.

The attribute of the pen 30 is reflected in the handwriting data. For example, according to the definition in FIG. 6A, the writing color of the handwriting data displayed on the display device 21 matches the writing color of the handwriting 40. Further, according to the definition in FIG. 6B, the thickness and shape of the handwriting in the displayed handwriting data further reflect the thickness and shape of the pen point 33. If a hard copy of the handwriting data is printed using an unillustrated color printer, it is possible to reflect the writing color, or the thickness and shape of the pen point.

Example of Configuration of Pen and Identification Circuit

Subsequently, configurations of the pen 30 and an identification circuit will be described in more detail.

Figure 7A:
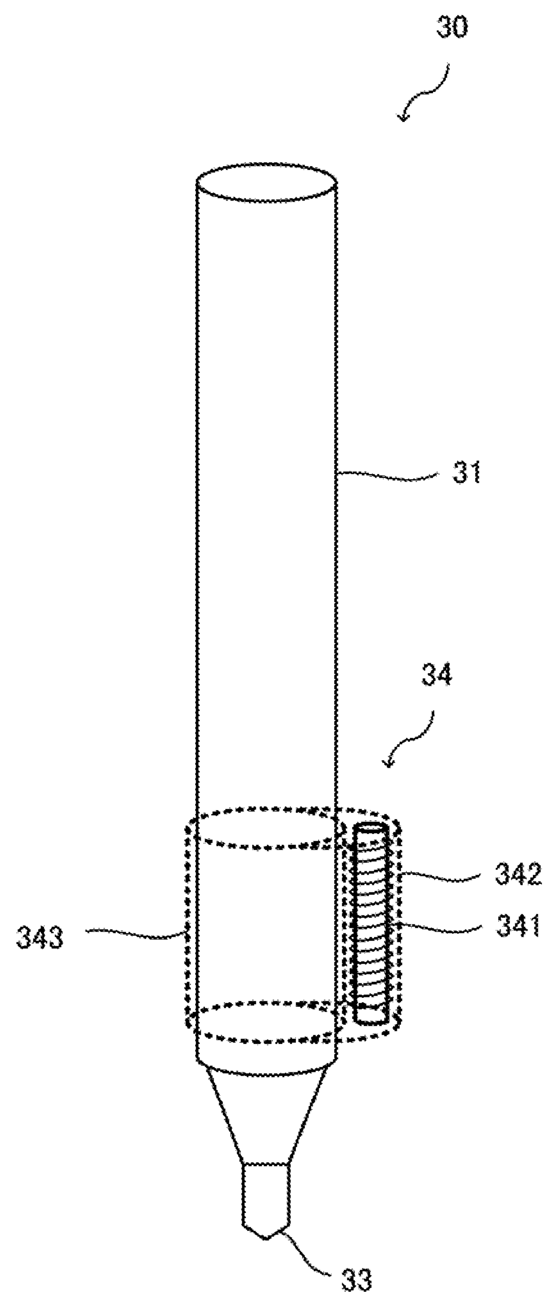
FIG. 7A is a lateral side view illustrating an appearance of a pen according to the embodiment of the present disclosure.
Figure 7B:
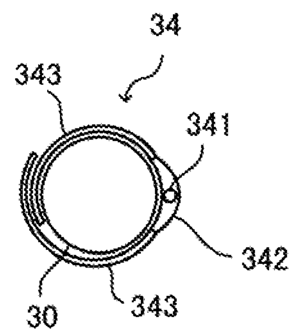
FIG. 7B is a top side view illustrating an appearance of an identifier according to the embodiment of the present disclosure.
Figure 7C:
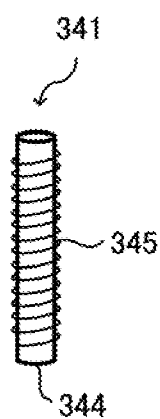
FIG. 7C is a lateral side view illustrating an appearance of a resonance coil according to the embodiment of the present disclosure.
Figure 7D:
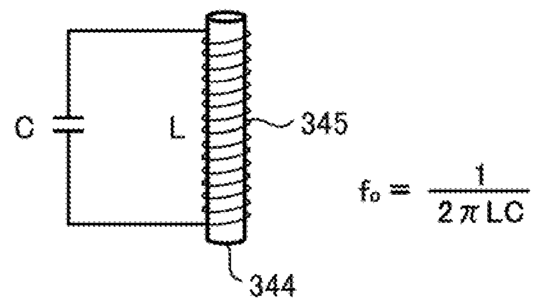
FIG. 7D is a circuit diagram illustrating a resonance circuit according to the embodiment of the present disclosure.

FIG. 7A to FIG. 7D are explanatory diagrams each illustrating an appearance of the pen 30, an appearance of the identifier 34 including the identification circuit, and the resonance circuit 35 serving as the identification circuit. FIG. 7A illustrates an appearance (lateral side view) of the pen 30, FIG. 7B illustrates an appearance (top side view) of the identifier 34, FIG. 7C illustrates an appearance (lateral side view) of a resonance coil 341 (resonator), and FIG. 7D illustrates the resonance circuit 35. FIG. 7A illustrates a state where the identifier 34 is attached to the pen body 31 of the pen 30.

As illustrated in FIG. 7A, the identifier 34 is attached near the pen point 33 of the pen body 31. The identifier 34 includes the resonance circuit 35 (identification signal output circuit) (not illustrated in FIG. 7A) including the resonance coil 341 (resonator), a container 342 that contains the resonance coil 341, and a holding member 343 that holds the identifier 34 in the pen body 31.

As illustrated in FIG. 7C, the resonance coil 341 includes a shaft core 344 and a conducting wire 345 (for example, a litz wire) wound around the shaft core 344 in a coil shape. The shaft core 344 is an iron core such as a ferrite bar having a diameter of 3 mm. If the identifier 34 is attached to the pen 30, the resonance coil 341 is formed in an elongated tube shape extending toward a distal end of the pen 30. The resonance coil 341 is smaller in outer shape than the pen 30.

The resonance circuit 35 is contained in the container 342 and is fixed in the container 342. Further, the container 342 contains the resonance coil 341 so that a shaft direction (a longitudinal direction: a direction orthogonal to a winding direction of the conducting wire 345) of the resonance coil 341 runs parallel to an axial direction (a longitudinal direction) of the pen 30 (the both longitudinal directions match, for example).

FIG. 7D illustrates a configuration of the resonance circuit 35. As illustrated in FIG. 7D, the resonance circuit 35 includes an inductance L and a capacitor C. An LC resonance circuit as illustrated in FIG. 7D has a configuration, for example, in which the resonance coil 341 (the shaft core 344 and the conducting wire 345) is molded with resin, and capacitors are connected to both ends of the conducting wire 345. It is noted that the LC resonance circuit may have a configuration in which a circuit pattern of a conductor is formed on a film-like insulator such as a flexible substrate, and a loop by joining both ends of the insulator is formed.

When at least one of the inductance L and the capacitor C is changed in magnitude, it is possible to obtain the resonance circuit 35 including a diff rent resonance frequency f0. That is, the resonance circuit 35 has a unique resonance frequency f0 and outputs an identification signal for identifying the attribute for the pen 30.

The pen identification device 12 identifies the attribute of the pen 30, based on the identification signal output from the resonance circuit 35. For example, the pen identification device 12 includes an induction signal output circuit 17 (see FIG. 1) that outputs an induction signal to the resonance circuit 35, and a resonance detection circuit 19 (see FIG. 1) that detects resonance induced into the resonance circuit 35 by the induction signal (see FIG. 1). The pen identification device 12 uses the induction signal output circuit 17 to output induction signals at a plurality of frequencies, and determines whether or not there is a resonance for each of the induction signals at each of the frequencies. The pen identification device 12 detects a resonance frequency of the resonance circuit 35 where a resonance is detected, and identifies the attribute predetermined correspondingly to the detected resonance frequency. The resonance detection circuit 19 is an example of a resonance detection circuit of the present disclosure. The induction signal output circuit 17 is an example of an induction signal output circuit of the present disclosure.

The identification signal corresponding to the attribute is identification information for identifying at least one of the writing colors, the thickness of the pen point 33 of the pen 30, and the shape of the pen point 33. As a result, as illustrated in FIG. 6A and FIG. 6B, it is possible to obtain the identifier 34 corresponding to each of the plurality of resonance frequencies f0.

The holding member 343 holds (fixes) the container 342 that contains the resonance circuit 35 to the pen body 31. Examples of the holding member 343 include a hook-and-loop fastener (see FIG. 7B) such as a magic tape (registered trademark), a double-sided tape, a fixing belt (fixing band), and an adhesive. Further, the holding member 343 may be formed of a holder (clip) made of polycarbonate or reinforced plastic. If the holding member 343 is shaped in a bolder, the holding member 343 has a size allowing an outer diameter of the pen body 31 to be tightly fitted to an inner diameter of the holding member 343. In addition, it is preferable that an elastic member such as rubber or polyurethane resin is provided on an inner peripheral surface of the holding member 343 to allow the identifier 34 to be attached to and held on the pen body 31 even if an outer diameter of the pen body 31 is slightly different.

It is preferable that the holding member 343 holds the identifier 34 detachably to the pen 30 near the distal end of the pen 30. It is noted that the holding member 343 holds the identifier 34 in a region between a central portion of the pen body 31 and the pen point 33.

The pen body 31 and the cap 32 may be a commercially available marker pen.

As illustrated in FIG. 7B, the identifier 34 can be held by winding the holding member 343 (for example, a hook-and-loop fastener) around the pen body 31. The user uses the pen 30 in a state illustrated in FIG. 7. That is, even if a commercially available marker pen is used, the pen 30 according to the present embodiment is obtained by attaching the identifier 34 to the marker pen.

As illustrated in FIG. 7A, it is preferable that the identifier 34 is attached to a position near the pen point 33 of the pen body 31 and is attached to a position where the cap 32 (see FIG. 1) is tightly fitted while the identifier 34 is held by the pen body 31. Further, it is preferable that the identifier 34 is attached (arranged) to a grip 38 (a portion to be gripped by a hand) gripped when the user writes with the pen 30.

According to the above configuration, the resonance coil 341 of the identifier 34 is attached to a position near the pen point 33 of the pen body 31 to run parallel to the axial direction (longitudinal direction) along an outer peripheral surface (side surface) of the pen 30.

According to the above configuration, the identifier 34 can be easily attached and detached to and from the pen 30. For example, it is possible to easily attach the identifier 34 to a general-purpose pen made by an office supplies manufacturer regularly purchased and used by the user. If the ink of the general-purpose pen runs out, it is possible to easily remove the identifier 34 and attach the identifier 34 to a new general-purpose pen. Thus, for example, if the identifier 34 is used with attached to a commercially available marker pen and the marker pen is worn, it is possible to remove the identifier 34 and attach the removed identifier 341 to a new marker pen. That is, the identifier 34 may be reused. Further, the ferrite bar configuring the shaft core 344 of the resonance coil 341 may be formed in a plate-like shape having a thickness of, for example, 1 mm to 1.5 mm. This allows to reduce a size and a thickness of the identifier 34 while a sensitivity of the resonance coil 341 is maintained.

It is noted that the identifier 34 (the resonance coil 341 and the resonance circuit 35) may be arranged inside the pen 30. For example, the resonance coil 341 may be arranged on an extension of the pen point 33 inside the pen 30, or may be arranged in a housing space cut out from a side surface of the pen body 31.

Here, in the touch input system 100, a position detection process for detecting, by the position detector 11, the position coordinates, and an attribute identification process for identifying, by the pen identification device 12, the attribute, are alternately executed. To realize this configuration, the controller 20 further includes a switching process operator 22 (see FIG. 1) that switches between the position detection process and the attribute identification process. The switching process operator 22 is an example of a switching process operator of the present disclosure.

Figure 8:
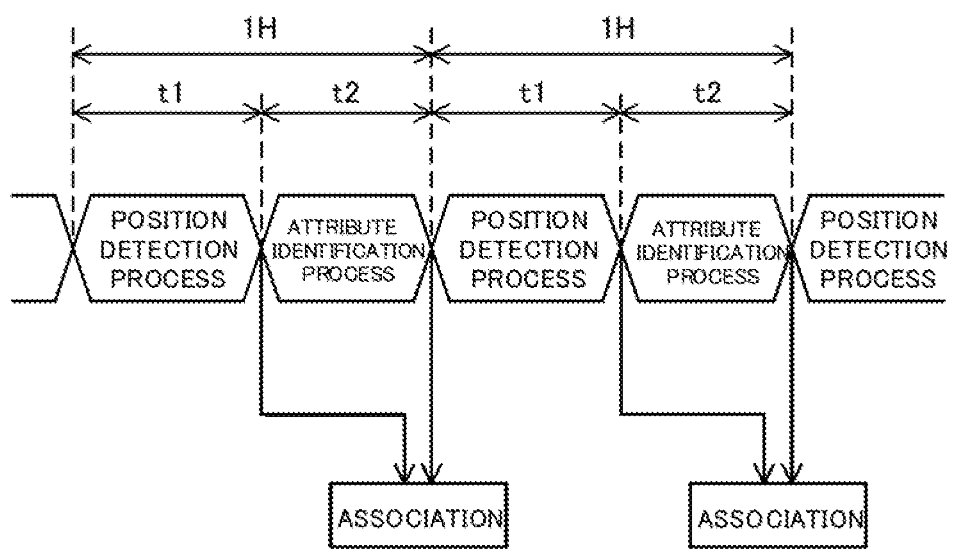
FIG. 8 is a chart illustrating an example of a flow of a position detection process and an attribute identification process in the touch input system according to the embodiment of the present disclosure.

FIG. 8 is a chart schematically illustrating a state where the position detection process and the attribute identification process are switched. For example, the switching process operator 22 transmits a switching signal SW1 (for example, an L level) (see FIG. 9) to the loop switching circuit 16 and the X detection drive circuit 14*x*. Upon receiving the switching signal SW1, the loop switching circuit 16 disconnects a U-shaped current path (an example of a loop circuit of the present disclosure) including a pair of X parallel electrodes 13*x*, and upon receiving: the switching signal SW1, the X detection drive circuit 14*x* disconnects the X parallel electrodes 13*x* from the X detection circuit 15*x*. As a result, in a first period t1 in one horizontal scanning period, the position detection process for detecting the position coordinates corresponding to the X parallel electrodes 13x for one line is performed.

When the position detection process is ended, the switching process operator 22 transmits a switching signal SW2 (for example, an H level) (see FIG. 9) to the loop switching circuit 16 and the X detection drive circuit 14x. Upon receiving the switching signal SW2, the loop switching circuit 16 connects the pair of X parallel electrodes 13x to form the U-shaped current path (loop circuit), and upon receiving the switching signal SW2, the X detection drive circuit 14x connects the pair of X parallel electrodes 13x to the X detection circuit 15x. The attribute identification process is performed in a second period t2 in one horizontal scanning period. Thus, the switching process operator 22 alternately outputs the switching signals SW1 and SW2 at a predetermined timing to switch between the position detection process and the attribute identification process.

Thus, in the attribute identification process, the plurality of X parallel electrodes 13x form a plurality of loop circuits that function as induction coils by connecting a set of two X parallel electrodes 13x. One end of each of the plurality of loop circuits is connected to the X detection drive circuit 14x that drives the induction coil, and the other end of each of the plurality of loop circuits is connected to the second selector switch 16b. In the attribute identification process, the second selector switch It connects the other ends of the plurality of loop circuits to the X detection circuit 15x and a discharge circuit 142.

The controller 20 acquires a processing result of the position detection process and a processing result of the attribute identification process, and stores information on the position coordinates of the pen 30 to be associated with information on the attribute (for example, the writing color) of the pen 30. The controller 20 generates the handwriting data, based on the associated information.

Discharge Circuit

In the touch input system, if the attribute identification process is performed by driving electromagnetic induction, electric charges are accumulated in each of the sensors (the X parallel electrodes 13x and the Y parallel electrodes 13y). Thus, it is difficult to detect in exact change in electrostatic capacitance in the position detection process, and therefore, an input detection accuracy is decreased. Further, if the attribute identification process is switched to the position detection process while electric charges are accumulated in the sensor, electric charges may flow into the sensor to destroy the device. To solve such a problem, the board 10 according to the present embodiment further includes the discharge circuit 142. The discharge circuit 142 executes a discharge process for discharging electric charges charged in the X parallel electrodes 13x and the Y parallel electrodes 13y. The controller 20 includes a discharge processing operator 23 that controls the discharge circuit 142. The discharge circuit 142 is an example of a discharge circuit of the present disclosure. It is noted that the discharge processing operator 23 may be provided in the board 10 or may be provided outside the hoard 10. For example, the discharge processing operator 23 may be provided in the X detection circuit 15x of the pen identification device 12.

Figure 9:
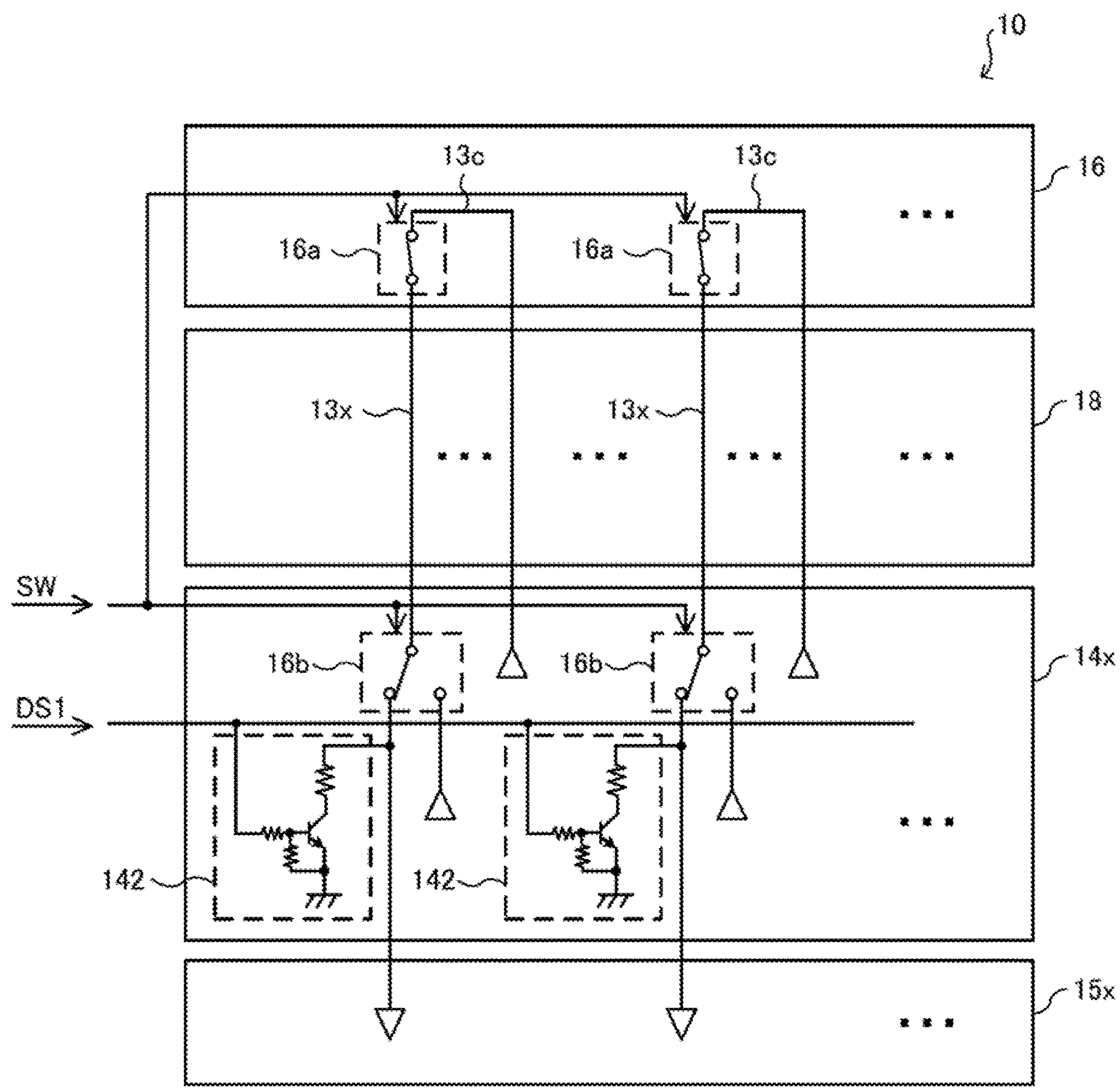
FIG. 9 is a diagram illustrating a specific configuration of the board according to the embodiment of the present disclosure.

As illustrated in FIG. 9, the discharge circuit 142 includes a transistor and a resistor, for example. A known technique may be applied to a configuration of the discharge circuit 142. For example, the discharge circuit 142 includes a first terminal (base terminal) that receives a control signal (discharge signal DS1) for switching ON and OFF of the transistor, a second terminal (collector terminal) connected to the X parallel electrode 13x via the second selector switch 16b, and a third terminal (emitter terminal) connected to GND (ground). The discharge processing operator 23 outputs a discharge signal DS1 (H level, L level) to the discharge circuit 142 at a predetermined timing. The discharge circuit 142 executes a discharge process while receiving an H-level discharge signal DS1, for example.

If the switching signal SW2 is input to the loop switching circuit 16 (first selector switch 16a), a U-shaped current path (loop circuit) is formed for the induction coil 13c, and if the switching signal SW2 is input to the X detection drive circuit 14x (second selector switch 16b), the X parallel electrode 13x at one end of the U-shaped current path is connected to the X detection circuit 15x. As a result, the discharge circuit 142 is electrically connected to the X parallel electrodes 13x. That is, the discharge circuit 142 is electrically connected to the X parallel electrodes 13x included in the sensor if performing an electromagnetic induction drive (attribute identification process). In a state where the X parallel electrodes 13x are connected to the discharge circuit 142, the discharge processing operator 23 inputs a discharge signal DS1 (for example, H level) for turning on the transistor, to the first terminal of the discharge circuit 142. As a result, the X parallel electrodes 13x are connected to the GND, and the electric charges charged in the sensor are released (discharged). For example, the discharge processing operator 23 inputs the H-level discharge signal DS1 to the discharge circuit 142 for a predetermined period (for example, 100 ms). After a predetermined period elapses, the discharge processing operator 23 inputs the L-level discharge signal DS1 to the discharge circuit 142, to stop the discharge process.

On the other hand, if the switching signal SW1 is input to the loop switching circuit 16 (first selector switch 16a), the pair of X parallel electrodes 13x are disconnected from each other, and if the switching signal SW1 is input to the X detection drive circuit 14x (second selector switch 16b), each of the X parallel electrodes 13x is disconnected from the X detection circuit 15x and connected to the X detection drive circuit 14x. As a result, the discharge circuit 142 is electrically disconnected from the X parallel electrodes 13x. That is, the discharge circuit 142 is electrically disconnected from the X parallel electrodes 13x included in the sensor during an electrostatic capacitance driving (position detection process). During the position detection process, the discharge processing operator 23 inputs the b-level discharge signal DS1 to the discharge circuit 142 to stop the discharge process.

Figure 10:
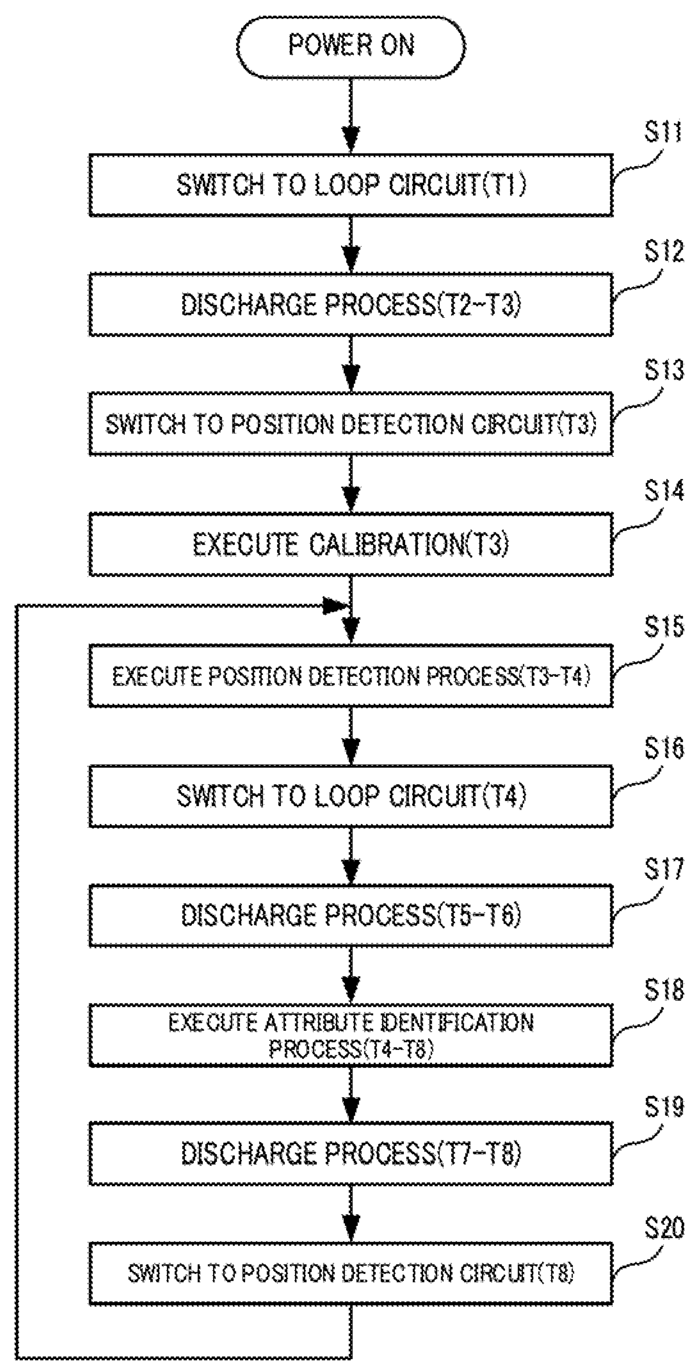
FIG. 10 is a flowchart illustrating an example of a flow of the position detection process and the attribute identification process in the touch input system according to the embodiment of the present disclosure.
Figure 11:
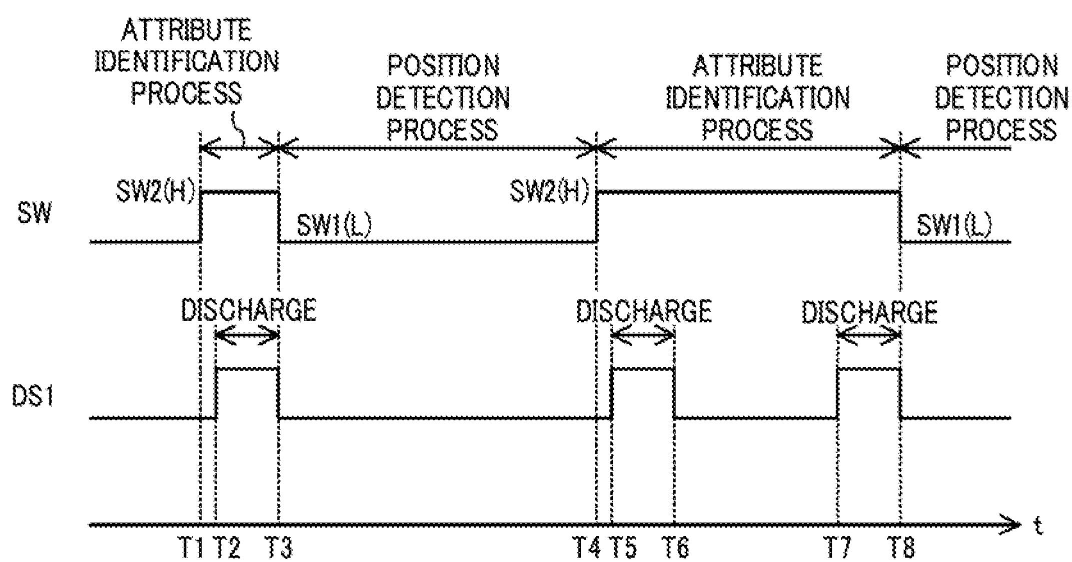
FIG. 11 is a time chart illustrating an example of a flow of the position detection process and the attribute identification process in the touch input system according to the embodiment of the present disclosure.

Here, a flow of processes executed in the touch input system 100 will be described with reference to FIG. 10. Here, an example of a flow of processes after the power of the board 10 is turned on will be described. FIG. 11 illustrates time series changes in the switching signal SW and the discharge signal DS1 corresponding to the flow of the processes illustrated in FIG. 10.

If the power of the board 10 is turned on, firstly, in step S11, the controller 20 (switching process operator 22) transmits (inputs) the switching signal SW2 (H level) to the loop switching circuit 16 and the X detection drive circuit 14x ("T1" In FIG. 11). As a result, the U-shaped current path (loop circuit) is formed, and the X parallel electrodes 13x are electrically connected to the X detection circuit 15x.

Next, in step S12, the discharge circuit 142 performs the discharge process. Specifically, the controller 20 (discharge processing operator 23) transmits (inputs) the H-level discharge signal DS1 to the first terminal of the discharge circuit 142 ("T2" in FIG. 11). As a result, a transistor of the discharge circuit 142 is turned on, and the X parallel electrodes 13*x* are connected to the GND. In this case, for example, electric charges charged in the sensor in a sensor bonding operation in a manufacturing process for the board 10 and electric charges charged in the sensor while the power of the board 10 is in the OFF state are released through the X parallel electrodes 13*x* to the GND. This allows to prevent an abnormal detection value, a malfunction, a destruction of the device, or the like caused when the board 10 is started. After transmitting the H-level discharge signal DS1 for a predetermined period (for example, 100 ms) ("T2" to "T3" in FIG. 11), the controller 20 switches the discharge signal to the L-level discharge signal DS1 ("T3" in FIG. 11). The discharge circuit 142 stops the discharge process if receiving the L-level discharge signal DS1.

Next, in step S13, the controller 20 (switching process operator 22) transmits (inputs) the switching signal SW1 (L level) to the loop switching circuit 16 and the X detection drive circuit 14*x* ("T3" in FIG. 11). As a result, the pair of X parallel electrodes 13*x* are disconnected from each other, and each of the X parallel electrodes 13*x* is disconnected from the X detection circuit 15*x* and connected to the X detection drive circuit 14*x*.

Next, in step S14, the controller 20 executes calibration. The calibration includes a well-known adjustment process such as adjustment of a touch position on a touch panel. Here, the calibration is executed after the discharge process for the sensor is executed, and thus, it is possible to execute an optimal adjustment process. Here, in the discharge process (S12) immediately after the power of the board 10 is turned on, it is possible to secure a longer discharge processing time than during a normal operation, and thus, for example, the discharge circuit 142 may execute the discharge process for a period of about 1000 ms. This makes it possible to reliably remove a large amount of electric charges in the sensor while the power of the board 10 is turned off. It is noted that, under use conditions in which the power of the board 10 is frequently turned on and off, the discharge processing time may be set short (for example, 500 ms).

Next, in step S15, the position detector 11 executes the position detection process ("T3" to "T4" in FIG. 11). In the position detection process, each of the plurality of X parallel electrodes 13*x* included in the plurality of loop circuits is disconnected, the selector switch connects one end of each of the plurality of X parallel electrodes 13*x* to the X detection drive circuit 14*x*, and the X detection drive circuit 14*x* drives each of the plurality of X parallel electrodes 13*x*. Thus, for example, the position detector 11 detects the position coordinates of the pen point 33 contacting the board 10, based on a change in electrostatic capacitance in the plurality of X parallel electrodes 13*x* and the plurality of Y parallel electrodes 13*y*.

Next, in step S16, the controller 20 (switching process operator 22) transmits (inputs) the switching signal SW2 (H level) to the loop switching circuit 16 and the X detection drive circuit 14*x* ("T4" in FIG. 11). As a result, the U-shaped current path (loop circuit) is formed, and the X parallel electrodes 13*x* are electrically connected to the X detection circuit 15*x*.

Next, in step S17, the discharge circuit 142 executes the discharge process. Specifically, the controller 20 (discharge processing operator 23) transmits (inputs) the H-level discharge signal DS1 to the first terminal of the discharge circuit 142 ("T5" in FIG. 11). As a result, a transistor of the discharge circuit 142 is turned on, and the X parallel electrodes 13*x* are connected to the GND. The discharge circuit 142 executes the discharge process alter the position detection process is switched to the attribute identification process. In this case, electric charges charged in the sensor in the position detection process are released through the X parallel electrodes 13*x* to the GND. Also in this case, after transmitting the H-level discharge signal DS1 for a predetermined period (for example, 100 ms) ("T5" to "T6" in FIG. 11), the controller 20 switches the discharge signal to the L-level discharge signal DS1 ("T6" in FIG. 11). The discharge circuit 142 stops the discharge process if receiving the L-level discharge signal DS1.

Next, in step S18, the pen identification device 12 executes the attribute identification process ("T4" to "T8" in FIG. 11). For example, the pen identification device 12 identifies at least one of the attributes such as the writing color of the pen 30, the thickness of the pen point 33, and the shape of the pen point 33.

Next, in step S19, the discharge circuit 142 executes the discharge process. Specifically, the controller 20 (discharge processing operator 23) transmits (inputs) the H-level discharge signal DS1 to the first terminal of the discharge circuit 142 ("T2" in FIG. 11). As a result, a transistor of the discharge circuit 142 is turned on, and the X parallel electrodes 13*x* are connected to the GND. The discharge circuit 142 executes the discharge process before the attribute identification process is switched to the position detection process. In this case, electric charges charged in the sensor in the attribute identification process are released through the X parallel electrodes 13*x* to the GND. Also in this case, after transmitting the H-level discharge signal DS1 for a predetermined period (for example, 100 ms) ("T7" to "T8" in FIG. 11), the controller 20 switches the discharge signal to the L-level discharge signal DS1 ("T8" in FIG. 11). The discharge circuit 142 stops the discharge process if receiving the L-level discharge signal DS1. In the discharge process (S17, S19) during the normal operation, the discharge circuit 142, may execute at least one discharge process in accordance with the switching timing between the position detection process and the attribute identification process.

Next, in step S20, the controller 20 (switching process operator 22) transmits (inputs) the switching signal SW1 (L level) to the loop switching circuit 16 and the X detection drive circuit 14*x* ("T8" in FIG. 11). As a result, the pair of X parallel electrodes 13*x* are disconnected from each other, and each of the X parallel electrodes 13*x* is disconnected from the X detection circuit 15*x* and connected to the X detection drive circuit 14*x*. Further, the controller 20 acquires a processing result of the position detection process and a processing result of the attribute identification process, and stores information on the position coordinates of the pen 30 to be associated with information on the attribute (for example, the writing color) of the pen 30. The controller 20 generates the handwriting data, based on the associated information.

Thereafter, the process returns to step S15, and the position detection process is executed again. Here, the discharge process for the sensor is executed before the position detection process is executed, and thus, it is possible to accurately detect a change in electrostatic capacitance without being affected by the electric charge in the position detection process. In addition, it is possible to prevent the device from being destroyed due to the electric charge flowing into the sensor.

Thus, according to the embodiment-based touch input system 100, it is possible to remove electric charges charged in the sensor before the position detection process is executed, and thus, it is possible to improve the detection accuracy of the input position coordinates. The discharge circuit 142 is electrically disconnected from the sensor (the X parallel electrodes 13*x* and the Y parallel electrodes 13*y*) during the position detection process, and is electrically connected to the sensor (the X parallel electrodes 13*x* and the Y parallel electrodes 13*y*) during the attribute identification process. Therefore, a load on each of the circuits included in the board 10 is reduced during the position detection process.

In the above-described embodiment, the discharge circuit 142 executes the discharge process at both timings, that is, at a timing at which the attribute identification process is switched to the position detection process and at a timing at which the position detection process is switched to the attribute identification process; however, the present disclosure is not limited thereto. In another embodiment, a configuration ma be employed in which the discharge circuit 142 executes the discharge process at the timing at which the attribute identification process is switched to the position detection process, and does nut execute the discharge process at the timing at which the position detection process is switched to the attribute identification process. According to this configuration, it is possible to shorten a processing time of the discharge process.

Figure 12:
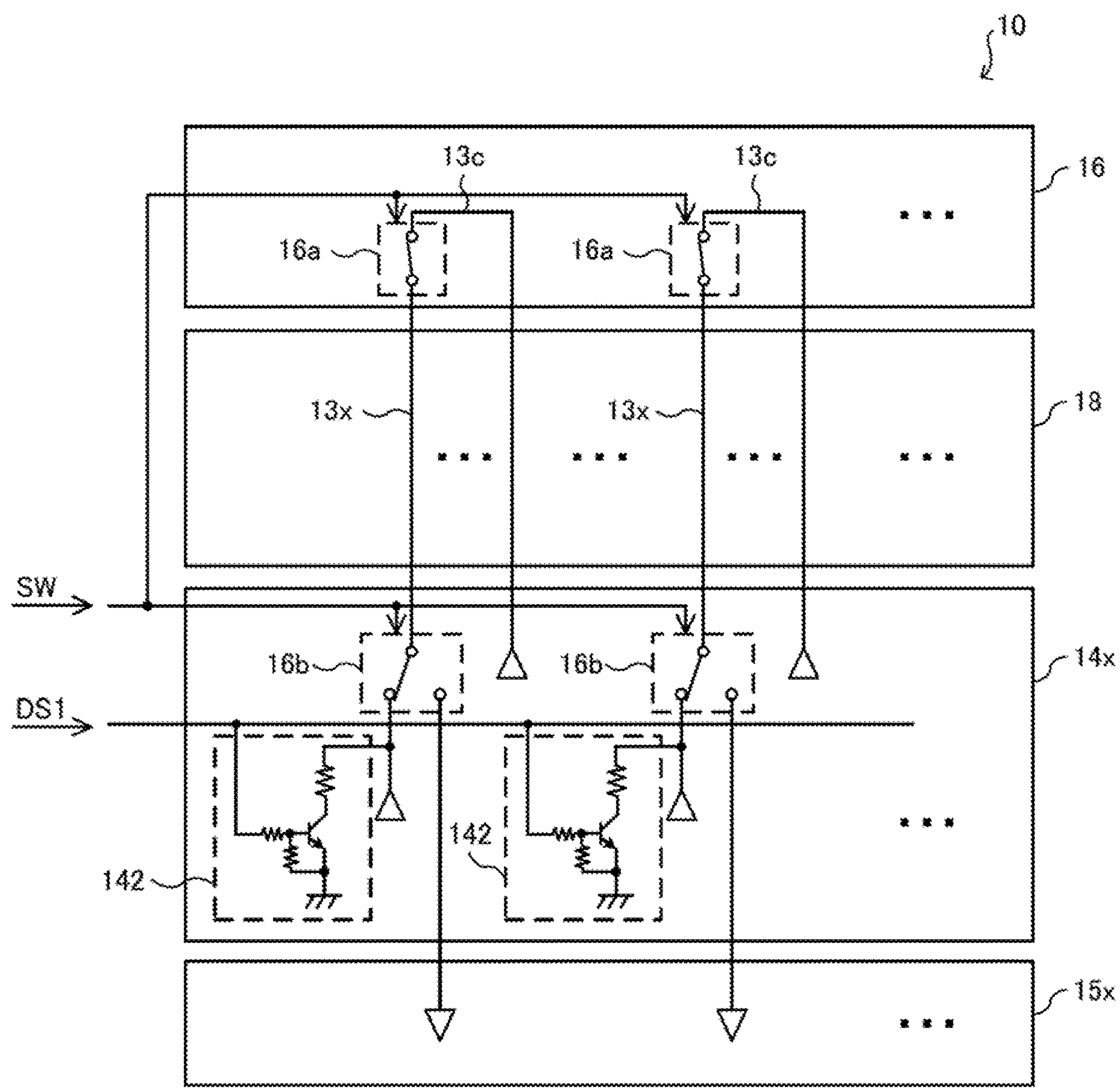
FIG. 12 is a diagram illustrating another configuration of the board according to the embodiment of the present disclosure.

If the influence of the load is not considered, the discharge circuit 142 may be electrically connected to a line connecting the X parallel electrodes 13*x* and the X detection drive circuit 14*x*, as illustrated in FIG. 12. That is, when the discharge circuit 142 is connected, the discharge circuit 142 may be connected to the X parallel electrodes 13*x* during the position detection process and disconnected from the X parallel electrodes 13*x* during the attribute identification process.

In the above-described process, the discharge circuit 142 may execute the discharge process only immediately before the position detection process. That is, the process in step S17 may be omitted. Accordingly, at least at a time of starting the position detection process, electric charges in the sensor are removed, and thus, it is possible to accurately detect a change in electrostatic capacitance in the position detection process.

Further, the discharge circuit 142 may be connected to all sets of loop circuits (induction coils 13*c*), or may be connected to the loop circuits (the induction coils 13*c*) for each of a plurality of sets.

The present disclosure is not limited to the above-described embodiment. For example, the input tool of the present disclosure may be an eraser that erases the handwriting.

In a conventional white plate eraser, a surface of an elastic member such as urethane is covered with brushed fibers. It is possible to erase the handwriting in the writing area 18 by wiping the handwriting on the writing area 18 by using an eraser made of the similar material as the marker pen.

Although the handwriting on the writing area 18 is erasable by using such a conventional eraser, the handwriting data cannot be synchronously updated. To synchronize the handwriting data, an eraser that allows the position detector 11 to recognize the position coordinates is needed.

Figure 13A:
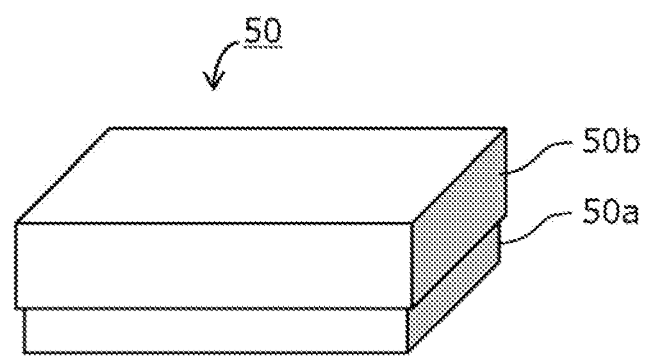
FIG. 13A is a perspective view illustrating an appearance of an eraser according to the embodiment of the present disclosure.
Figure 13B:
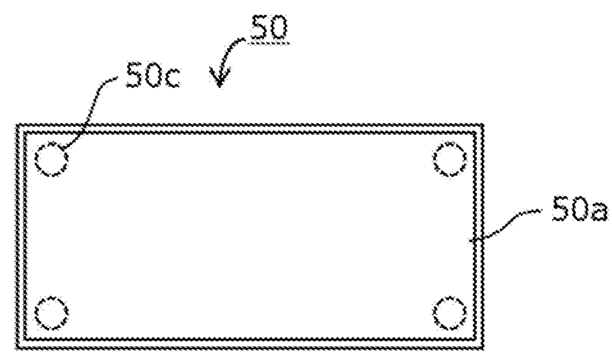
FIG. 13B is a diagram illustrating a bottom surface of the eraser according to the embodiment of the present disclosure.
Figure 13C:
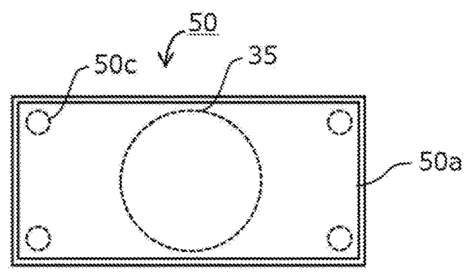
FIG. 13C is a diagram obtained when the resonance circuit is arranged on the bottom surface of the eraser according to the embodiment of the present disclosure.

FIG. 13A to FIG. 13C are explanatory diagrams each illustrating a configuration of the eraser. As illustrated in FIG. 13A, an eraser 50 includes an erasing surface 50*a* and a grip 50*b*. The erasing surface 50*a* is formed of a rectangular parallelepiped elastic member as a core material, where a surface thereof is covered with brushed fibers. Members of the appearance and the surface are substantially the same as those of the conventional whiteboard eraser.

A difference from the conventional eraser is that, on a bottom surface (see FIG. 13B) of the erasing surface 50*a*, dielectric materials 50*c* detectable by the position detector 11 are arranged at at least four corners of the core material. The dielectric materials 50*c* are arranged so that when the bottom surface of the eraser 50 contacts the board 10, the position detector 11 recognizes respective positions of the four corners of the erasing surface 50*a*. As long as the position detector 11 is capable of detecting the position, a metallic material may be used instead of the dielectric material.

A capacitive touch panel detects a so-called multi-touch, and thus, the capacitive touch panel detects the positions of the respective dielectric materials 50*c* arranged at the four corners of the eraser 50. For example, if the position detector 11 simultaneously detects four position coordinates in an area having a predetermined size, it is possible to determine that the four position coordinates are for the eraser 50 rather than for the pen 30 or the finger. Thus, it is possible to distinguish the eraser 50 from the pen 30 or the finger.

If the eraser 50 is recognized and the positions of the four dielectric materials are detected moving on the board, the handwriting data is erased within a range in which a rectangular region formed by connecting the position coordinates of the four dielectric materials in a straight line moves. With this process, it is possible to erase a corresponding part of the handwriting data in synchronization with erasing of the handwriting in the writing area 18.

It is noted that as illustrated in FIG. 13C, in addition to the dielectric materials 50*c*, the identifier 34 may be attached to the eraser 50. For example, the resonance circuit 35 serving as an identification circuit is arranged in the elastic member of the eraser 50. When the eraser 50 is imparted with a unique resonance frequency f0 different from that of the pen 30, it is possible to more reliably identify the pen 30 or the finger from the eraser 50 by an identification signal.

In the touch input system 100, an input process may be performed by switching among an input mode for entering an input (writing) by the pen 30, an input mode for entering an input (erasing a handwriting) by the eraser 50, an input mode for entering an input by another input tool (such as a brush), and the like. For example, each of the input tools (the pen 30, the eraser 50, the brush, and the like) is assigned with any one of a plurality of types of input modes (a pen input mode, an eraser input mode, a brush input mode, and the like). In this case, the attribute is information on the input mode assigned to each of the input tools. As a result, the touch input system 100 performs the input process in the input mode identified by the pen identification device 12. Thus, if a plurality of types of input tools are used, it is possible to appropriately identify the types of those input tools.

As described above, the touch input system 100 according to the present disclosure determines the types of the input tools the color of the pen 30, the thickness of the pen point 33, the shape of the pen point 33, the pen, the eraser, the brush, and the like), based on the attribute for the input tool including various writing tools, such as a pen including a marker pen and an electronic pen, an eraser, and a brush, capable of writing on the input surface (hoard 10). In addition, the discharge circuit 142 discharges electric charges charged on the sensor at a predetermined cycle. Thus, in the touch input system 100 for performing the electrostatic capacitance driving and the electromagnetic induction driving, it is possible to improve the input detection accuracy by removing electric charges charged in the sensor.

In addition to each of the above-described embodiments, various modifications of the present invention are possible. These modifications should not be interpreted as not belonging to the scope of the present invention. The present invention shall include a meaning equivalent to the scope of the claims and all modifications within the scope.

It is to be understood that the embodiments herein are illustrative and not restrictive, since the scope of the disclosure is defined by the appended claims rather than by the description preceding them, and all changes that fail within metes and bounds of the claims, or equivalence of such metes and bounds thereof are therefore intended to be embraced by the claims.

What is claimed is:

1. A touch input system for entering an input with an input tool onto an input surface for touch input, comprising:
- a plurality of sensor electrodes,
- a position detection circuit that executes a position detection process for detecting a position on the input surface contacted by the input tool, based on a change in electrostatic capacitance of the plurality of sensor electrodes;
- an input tool identification circuit that executes an attribute identification process for identifying an attribute for the input tool;
- a discharge circuit that executes a discharge process for discharging electric charges charged in the plurality of sensor electrodes; and
- a switching processing circuit that alternately switches the attribute identification process and the position detection process, wherein
- the discharge circuit executes the discharge process before the attribute identification process is switched to the position detection process.

2. The touch input system according to claim 1, wherein the discharge circuit further executes the discharge process after the position detection process is switched to the attribute identification process.

3. The touch input system according to claim 1, wherein the discharge circuit is electrically disconnected from the plurality of sensor electrodes during the position detection process, and is electrically connected to the plurality of sensor electrodes during the attribute identification process.

4. The touch input system according to claim 1, wherein in the attribute identification process, the plurality of sensor electrodes form a plurality of loop circuits that function as an induction coil as a result of each two of the sensor electrodes being connected to each other,
- a first end of each of the plurality of loop circuits is connected to a drive circuit that drives the induction coil, and a second end of each of the plurality of loop circuits is connected to a selector switch that switches a connection destination of the plurality of sensor electrodes, and
- in the attribute identification process, the selector switch connects the second end of each of the plurality of loop circuits to the discharge circuit and a detection circuit that detects a magnitude of a current flowing through the induction coil.

5. The touch input system according to claim 4, wherein in the position detection process, each of the plurality of sensor electrodes included in the plurality of loop circuits is disconnected, the selector switch connects the first end of each of the sensor electrodes to the drive circuit, and the drive circuit drives each of the plurality of sensor electrodes.

6. The touch input system according to claim 1, wherein the input tool is configured so that an identification signal output circuit that outputs an identification signal for the input tool identification circuit to identify the attribute is attachable to the input tool.

7. The touch input system according to claim 6, wherein the identification signal output circuit is a resonance circuit having a unique resonance frequency,
- the input tool identification circuit includes an induction signal output circuit that outputs an induction signal to the resonance circuit and a resonance detection circuit that detects a resonance induced by the induction signal to the resonance circuit, and
- the input tool identification circuit outputs the induction signal at a plurality of frequencies by using the induction signal output circuit, determines presence or absence of a resonance for the induction signal at each of the frequencies to detect the resonance frequency of the resonance circuit, and identifies the attribute predetermined correspondingly to the detected resonance frequency.

8. The touch input system according to claim 1, wherein the input tool is a pen, and
- the position detection circuit detects the position by detecting a change in electrostatic capacitance at a contact position between a pen point impregnated with ink in the pen and the input surface, or at a handwriting position created by the ink being applied to the input surface by the contact.

9. The touch input system according to claim 1, wherein the input tool is a pen, and
- the attribute is information of at least any one of an input color by the pen, a thickness of the pen point of the pen, and a shape of the pen point of the pen.

10. A touch input system for entering an input with an input tool onto an input surface for touch input, comprising:
- a plurality of sensor electrodes;
- a position detection circuit that executes a position detection process for detecting a position on the input surface contacted by the input tool, based on a change in electrostatic capacitance of the plurality of sensor electrodes;
- an input tool identification circuit that executes an attribute identification process for identifying an attribute for the input tool; and
- a discharge circuit that executes a discharge process for discharging electric charges charged in the plurality of sensor electrodes, wherein
- the discharge circuit is electrically disconnected from the plurality of sensor electrodes during the position detection process, and is electrically connected to the plurality of sensor electrodes during the attribute identification process.

11. The touch input system according to claim 10, wherein in the attribute identification process, the plurality of sensor electrodes form a plurality of loop circuits that function as an induction coil as a result of each two of the sensor electrodes being connected to each other,
- a first end of each of the plurality of loop circuits is connected to a drive circuit that drives the induction coil, and a second end of each of the plurality of loop circuits is connected to a selector switch that switches a connection destination of the plurality of sensor electrodes, and in the attribute identification process, the selector switch connects the second end of each of the plurality of loop circuits to the discharge circuit and a detection circuit that detects a magnitude of a current flowing through the induction coil.

12. The touch input system according to claim 11, wherein in the position detection process, each of the plurality of sensor electrodes included in the plurality of loop circuits is disconnected, the selector switch connects the first end of each of the sensor electrodes to the drive circuit, and the drive circuit drives each of the plurality of sensor electrodes.

13. The touch input system according to claim 10, wherein the input tool is configured so that an identification signal output circuit that outputs an identification signal for the input tool identification circuit to identify the attribute is attachable to the input tool.

14. The touch input system according to claim 13, wherein the identification signal output circuit is a resonance circuit having a unique resonance frequency, the input tool identification circuit includes an induction signal output circuit that outputs an induction signal to the resonance circuit and a resonance detection circuit that detects a resonance induced by the induction signal to the resonance circuit, and the input tool identification circuit outputs the induction signal at a plurality of frequencies by using the induction signal output circuit, determines presence or absence of a resonance for the induction signal at each of the frequencies to detect the resonance frequency of the resonance circuit, and identifies the attribute predetermined correspondingly to the detected resonance frequency.

15. The touch input system according to claim 10, wherein the input tool is a pen, and the position detection circuit detects the position by detecting a change in electrostatic capacitance at a contact position between a pen point impregnated with ink in the pen and the input surface, or at a handwriting position created by the ink being applied to the input surface by the contact.

16. A touch input system for entering an input with an input tool onto an input surface for touch input, comprising:

a plurality of sensor electrodes;

a position detection circuit that executes a position detection process for detecting a position on the input surface contacted by the input tool, based on a change in electrostatic capacitance of the plurality of sensor electrodes;

an input tool identification circuit that executes an attribute identification process for identifying an attribute for the input tool; and a discharge circuit that executes a discharge process for discharging electric charges charged in the plurality of sensor electrodes, wherein in the attribute identification process, the plurality of sensor electrodes form a plurality of loop circuits that function as an induction coil as a result of each two of the sensor electrodes being connected to each other, a first end of each of the plurality of loop circuits is connected to a drive circuit that drives the induction coil, and a second end of each of the plurality of loop circuits is connected to a selector switch that switches a connection destination of the plurality of sensor electrodes, and in the attribute identification process, the selector switch connects the second end of each of the plurality of loop circuits to the discharge circuit and a detection circuit that detects a magnitude of a current flowing through the induction coil.

17. The touch input system according to claim 16, wherein in the position detection process, each of the plurality of sensor electrodes included in the plurality of loop circuits is disconnected, the selector switch connects the first end of each of the sensor electrodes to the drive circuit, and the drive circuit drives each of the plurality of sensor electrodes.

18. The touch input system according to claim 16, wherein the input tool is configured so that an identification signal output circuit that outputs an identification signal for the input tool identification circuit to identify the attribute is attachable to the input tool.

19. The touch input system according to claim 18, wherein the identification signal output circuit is a resonance circuit having a unique resonance frequency, the input tool identification circuit includes an induction signal output circuit that outputs an induction signal to the resonance circuit and a resonance detection circuit that detects a resonance induced by the induction signal to the resonance circuit, and the input tool identification circuit outputs the induction signal at a plurality of frequencies by using the induction signal output circuit, determines presence or absence of a resonance for the induction signal at each of the frequencies to detect the resonance frequency of the resonance circuit, and identifies the attribute predetermined correspondingly to the detected resonance frequency.

20. The touch input system according to claim 16, wherein the input tool is a pen, and the position detection circuit detects the position by detecting a change in electrostatic capacitance at a contact position between a pen point impregnated with ink in the pen and the input surface, or at a handwriting position created by the ink being applied to the input surface by the contact.

* * * * *